United States Patent [19]

Kayanuma

[11] Patent Number: 5,282,383
[45] Date of Patent: Feb. 1, 1994

[54] METHOD AND APPARATUS FOR DETERMINING DETERIORATION OF THREE-WAY CATALYSTS IN DOUBLE AIR-FUEL RATIO SENSORS SYSTEM

[75] Inventor: Nobuaki Kayanuma, Gotenba, Japan

[73] Assignee: Toyota Jidosha Kabushiki Kaisha, Toyota, Japan

[21] Appl. No.: 872,249

[22] Filed: Apr. 22, 1992

[30] Foreign Application Priority Data

Apr. 23, 1991 [JP] Japan .................. 3-092255
Apr. 14, 1992 [JP] Japan .................. 4-094369

[51] Int. Cl.$^5$ .......................................... G01M 19/00
[52] U.S. Cl. ................................................ 73/118.1
[58] Field of Search ............... 73/118.1; 340/438, 439; 364/431.01, 431.04–431.06; 60/277

[56] References Cited

U.S. PATENT DOCUMENTS 4,622,809 11/1986 Abthoff et al. .
4,691,562 9/1987 Abthoff et al. .
5,119,628 6/1992 Uema et al. .................. 60/277

FOREIGN PATENT DOCUMENTS 60-231155 11/1985 Japan .
61-185634 8/1986 Japan .
61-286550 12/1986 Japan .
62-29711 2/1987 Japan .
63-97852 4/1988 Japan .
2-30915 2/1990 Japan .
2-33408 2/1990 Japan .
2-91440 3/1990 Japan .
2-207159 8/1990 Japan .
3-57862 3/1991 Japan .
3-217643 9/1991 Japan .

Primary Examiner—Robert Raevis
Attorney, Agent, or Firm—Oliff & Berridge

[57] ABSTRACT

In a double air-fuel ratio sensor system including two air-fuel ratio sensors disposed on the upstream and the downstream of the catalyst which is installed in the exhaust passage of the engine and has oxygen storage effect, an air-fuel ratio correction amount is calculated in accordance with the output of the upstream O$_2$ sensor, and the actual air-fuel ratio is adjusted in accordance with the calculated air-fuel ratio correction amount. Further, the determination of the deterioration of the catalyst is carried out in accordance with the output of the second O$_2$ sensor when the air-fuel ratio of the engine is adjusted.

33 Claims, 13 Drawing Sheets

METHOD AND APPARATUS FOR DETERMINING DETERIORATION OF THREE-WAY CATALYSTS IN DOUBLE AIR-FUEL RATIO SENSORS SYSTEM

BACKGROUND OF THE INVENTION

1. Field of the Invention

The present invention relates to methods and apparatuses for determining a rate of deterioration of three way reducing and oxidising catalysts in a system having double air-fuel ratio sensors upstream and downstream of the catalysts in an exhaust gas passage.

2. Description of the Related Art

In a known air-fuel ratio control system, an air-fuel ratio sensor is disposed in the exhaust passage near a combustion chamber, i.e., near the concentration portion of the exhaust manifold. In this system, however, accurate air-fuel ratio control is disturbed because of the dispersion of the output characteristics of the air-fuel ratio sensor.

To compensate for the above dispersion, and to compensate for the dispersion and the aged deterioration of parts used for fuel injection, a so-called double air-fuel sensor system that controls the air-fuel ratio based on an output of a second air-fuel ratio sensor disposed in the downstream side of the catalysts in addition to an output of the first air-fuel ratio sensor disposed in the upstream side of the catalysts is suggested (See Japanese Unexamined Patent Application (Kokai) No. 61-286550).

In this system, the second air-fuel ratio sensor has a poorer response speed but smaller dispersion than the first air-fuel ratio sensor for the following reasons.

(1) The second air-fuel ratio sensor receives less thermal influence of the exhaust gas, because its temperature is low at the downstream side of the catalyst.

(2) The second air-fuel sensor is exposed to less poisoning, because various kinds of polutants are trapped in the catalyst.

(3) Exhaust gas attains uniformity and a state of equilibrium at the downstreams side of the catalyst.

The double air-fuel sensor system, therefore, can compensate for the dispersion of the first air-fuel ratio sensor by using the second air-fuel ratio sensor. That is, in the single air-fuel ratio sensor system, HC, CO and $NO_x$ emissions increase after the first air-fuel ratio sensor deteriorates, but in the double air-fuel ratio sensor system, HC, CO and $NO_x$ emissions do not increase even after the first air-fuel ratio sensor deteriorates as long as the second air-fuel ratio sensor maintains stability.

In the double air-fuel ratio sensor system, however, after the catalyst deteriorates, HC, CO and $NO_x$ emissions increase and the output of the second air-fuel ratio sensor fluctuates. That is, an amplitude of an output voltage of the second air-fuel ratio sensor increases and its period becomes shorter.

The detection of the deterioration of the catalyst, therefore, is important to obtain normal emission, and the methods to determine whether or not the catalyst has deteriorated for example based on the ratio of the inverting period of the output voltage of the second air-fuel ratio sensor to that of the first air-fuel ratio sensor is suggested (See Japanese Unexamined Patent Application (Kokai) No. 61-286550).

With the above method, however, it is possible to distinguish a deterioration of the catalyst, for example the rejection ratio of HC becomes less than 80%, from the normal condition, that is, the rejection ratio of HC remains more than 80%. But it is not possible to distinguish an extremely abnormal deterioration that requires the replacement of the catalyst, for example the rejection ratio of HC becomes less than 50%, from a normal aged deterioration that remains enough rejection ratio, that is, 80%.

As a result, HC, CO and $NO_x$ emissions are increased if the replacement of the catalyst is delayed.

SUMMARY OF THE INVENTION

Therefore, an object of the present invention is to provide an air-fuel ratio feedback control system able to determine the degree of the deterioration of the catalyst.

According to this invention, in a double air-fuel ratio sensor system including two air-fuel ratio sensors on the upstream side and downstream side of the catalyst installed in the exhaust passage of the engine and having an oxygen storage effect, an air-fuel ratio correction amount is calculated in accordance with the output of the upstream $O_2$ sensor (the first $O_2$ sensor), and the actual air-fuel ratio is adjusted in accordance with the calculated air-fuel ratio correction amount. Further, the determination of the deterioration of the catalyst is carried out in accordance with the output of the downstream $O_2$ sensor (the second $O_2$ sensor) when the center of the air-fuel ratio is forced to shift.

BRIEF DESCRIPTION OF THE DRAWINGS

The present invention will be more clearly understood from the description set forth below with reference to the accompanying drawings.

DESCRIPTION OF THE PREFERRED EMBODIMENTS

Figure 1:
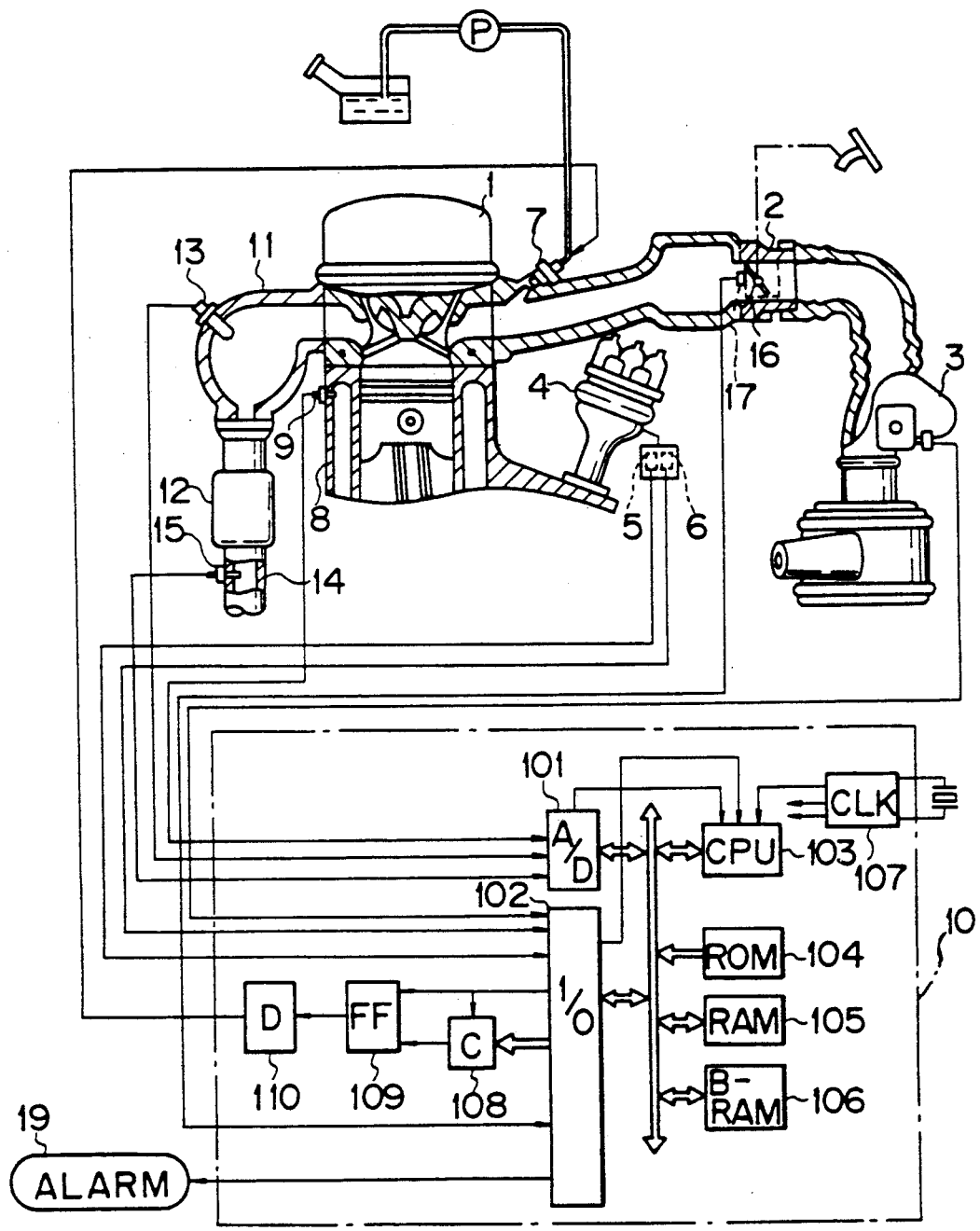
FIG. 1 is a schematic view of an internal combustion engine according to the present invention.
Figure 2A:
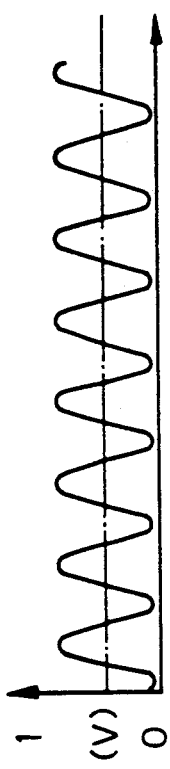
FIGS. 2(A)-2(E) are timing diagrams explaining the conventional operation of the double $O_2$ sensor system.
Figure 2B:
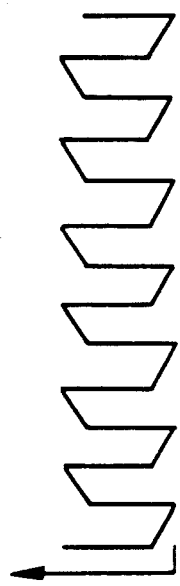
Figure 2C:
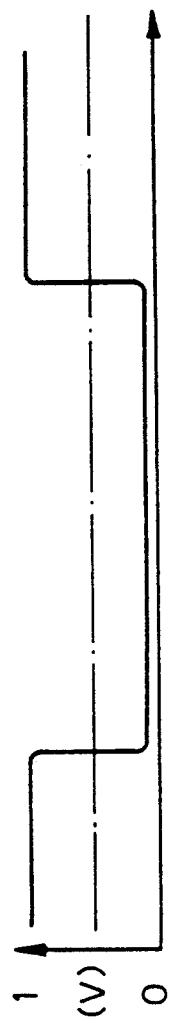
Figure 2D:
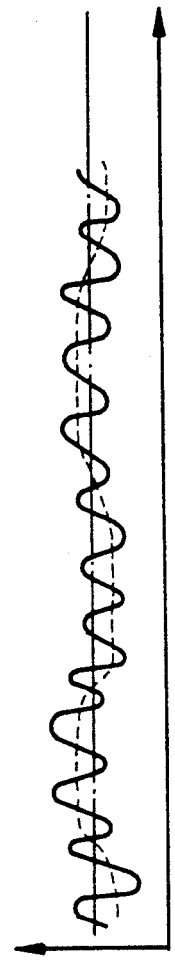
Figure 2E:
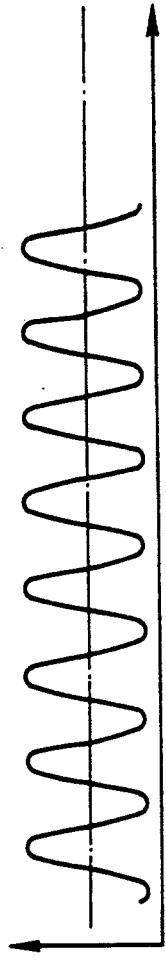

In FIG. 1, which illustrates an internal combustion engine according to the present invention, an air-flow meter 3 is disposed in the intake pipe 2 of the engine 1. This air-flow meter 3 is directly used for measuring the intake air flow rate, and generates an analog signal proportional to the air flow rate from an equipped potentiometer. The output signal of this air-flow meter is applied to an A/D converter with the multiplexer 101 of the control circuit 10.

The distributor 4 is equipped with two crank angle sensors 5 and 6. The sensor 5 generates a pulse signal at every 720° crank angle and the sensor 6 generates a pulse signal at every 30° crank angle. These pulse signals are applied to the I/O interface 102 of the control circuit 10, and the output pulse of the sensor 6 is applied to the interrupt terminal of the CPU 103.

The injection valve 7 is also provided on the intake pipe 2 to supply pressurized fuel to each cylinder from the fuel supply system.

At the water-jacket on the cylinder block of the engine 1, there is a temperature sensor 9 for measuring the temperature of the coolant. The sensor 9 generates an analog signal proportional to the coolant temperature THW. The output signal of the sensor 9 is also applied to the A/D converter 101.

In the exhaust passage of the downstream side of the exhaust manifold 11 there is a catalyst converter 12 that contains a three-way catalyst for rejecting the three pollutants HC, CO and $NO_x$.

At the exhaust manifold 11, that is the upstream side of the catalyst converter 12, the first $O_2$ sensor 13 is disposed, and at the downstream side of the catalyst converter, the second $O_2$ sensor 15 is disposed. These two $O_2$ sensors 13 and 15 generate output voltage according to the concentration of oxygen composition in the exhaust gas. That is, these sensors generate a high voltage when the exhaust gas is rich, and generate a low voltage when it is lean. The outputs of these sensors are applied to the A/D converter 101.

Figure 3:
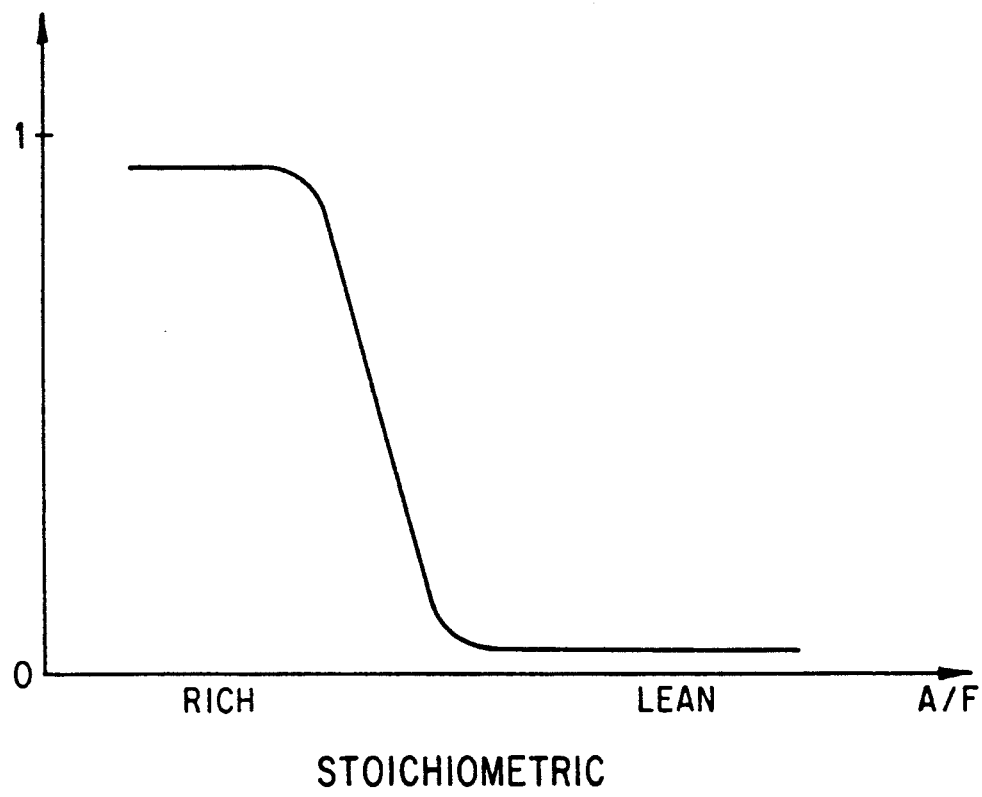
FIG. 3 is an output-characteristic curve of the $O_2$ sensor.
Figure 4A:
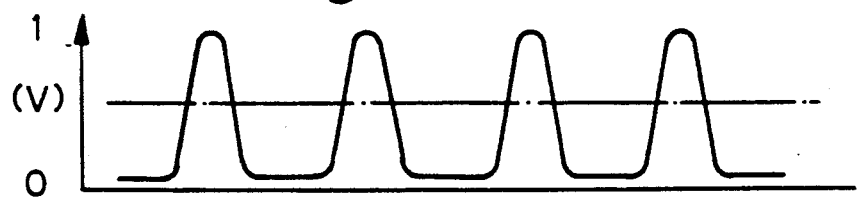
FIGS. 4(A)-4(E) are timing diagrams explaining the operation of the double $O_2$ sensor system of the present invention.
Figure 4B:
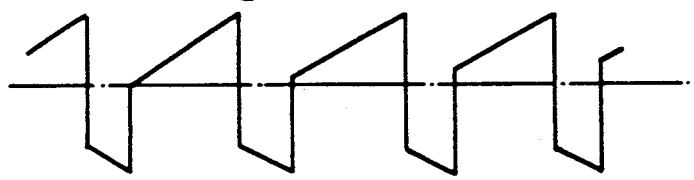
Figure 4C:
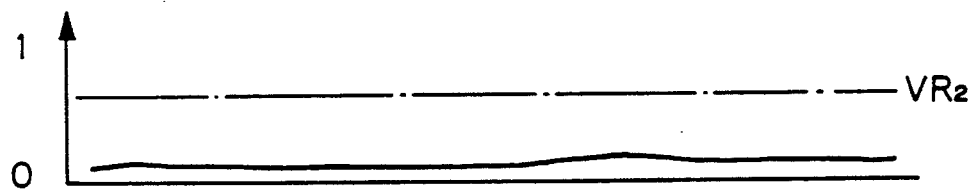
Figure 4D:
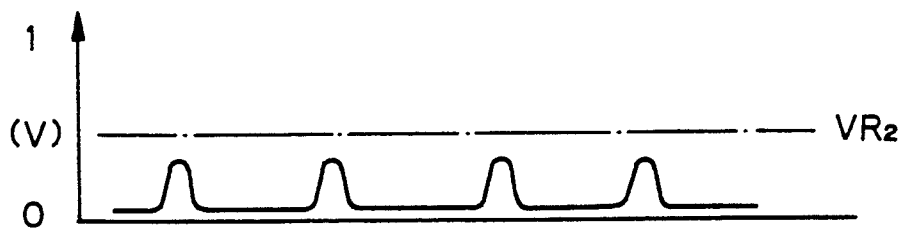
Figure 4E:
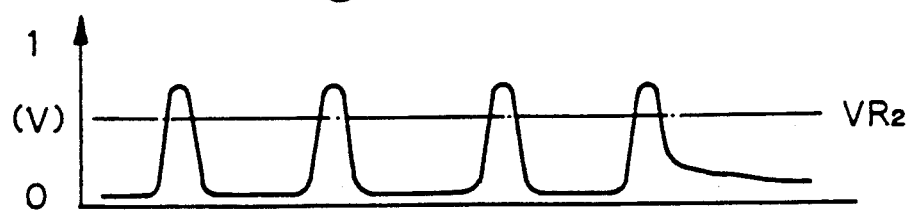

Note, the $O_2$ sensors 13 or 15 generate the output signal shown in FIG. 3 in accordance with the air-fuel ratio of the exhaust gas.

The control circuit 10, which may be constructed by the microcomputer system, comprises a ROM 104, a RAM 105, a back-up RAM 106, a clock generator 107, in addition to a A/D converter 101, I/0 interface 102 and CPU 103.

On the throttle valve 16 in the intake pipe 2 there is an idle switch 17 that generates a signal LL when the throttle valve 16 is fully closed. This signal LL is applied to the control circuit 10 through the I/O interface 102.

An alarm 19 is provided to acknowledge the replacement of the catalyst.

The down counter 108, the flip flop 109 and the drive circuit 110 are used for controlling the fuel injection valve 7. That is, a fuel injection amount TAU is calculated in TAU routine, Which is explained later, the amount TAU is preset in the downcounter 108, and simultaneously, the flip flop is also set. As a result, the drive circuit 110 activates the fuel injection valve 7. The down counter 108 counts down the clock pulse from the clock generator 107, and finally generates a logic "1" signal from the carry-out terminal thereof to reset the flip flop 109 so that the drive circuit 110 stops the activation of the fuel injection valve 7. Thus the amount of fuel corresponding to the fuel injection amount TAU is injected into the fuel injection valve 7.

Interruptions occur at the CPU 103, when the A/D converter 101 completes an A/D conversion, when the crank angle sensor 6 generates a pulse signal, etc.

The intake air amount Q from the air-flow sensor 3 and the coolant temperature THW are fetched by the A/D conversion routines executed at predetermined intervals and are then stored in the RAM 105. Namely, the data Q and THW in the RAM 105 are renewed at predetermined intervals. The engine speed Ne is calculated by the interrupt routine executed at every 30° CA, i.e. at every pulse signal from the crank angle sensor 6, and then stored in the RAM 105.

The principal operation according to the present invention is explained based on FIG. 2 to 4.

FIG. 2 is a timing diagram explaining the operation of the conventional double $O_2$ sensor system, and FIG. 3 is the output characteristic curve of the $O_2$ sensor.

In FIG. 2, (A) denotes the output of the first $O_2$ sensor, and (B) denotes the air-fuel ratio correction amount that is calculated in the double $O_2$ sensor system and used to control the air-fuel ratio at the stoichiometric air-fuel ratio.

(C) denotes that output of the second $O_2$ sensor when the air-fuel ratio is controlled with the air-fuel ratio correction amount when the catalyst is in the normal condition.

(D) denotes the same when the rejection ratio of the catalyst deteriorates to about 80%, and (E) denotes the same when the rejection ratio of the catalyst deteriorates to about 50%.

From these figures, it is understood that it is impossible for the conventional method to distinguish (D) from (E) because the reverse number of the output increase both in (D) and (E), although it is possible to distinguish (C) from (D) and (E), as long as the air-fuel ratio is controlled at the stoichiometric air-fuel ratio.

FIG. 4 is a timing diagram explaining the principal operation in accordance with the present invention.

In FIG. 4, (A) denotes the output of the first $O_2$ sensor, and (B) denotes the air-fuel ratio correction amount that is changed in order to shift actual air-fuel ratio to the lean side from the stoichiometric air-fuel ratio.

(C), (D) and (E) are the same in FIG. 2.

It is clearly understood, from FIG. 4 showing various outputs according to the embodiment of this invention, that (E) can be distinguished from (C) or (D), because the reverse number per unit time period of the output of the second $O_2$ sensor in (E) is larger than in (D) or in (C).

In the embodiment, the air-fuel ratio is controlled based on the outputs of the first $O_2$ sensors disposed at the upstream of the catalyst.

The operation in the embodiment of the control circuit 10 will be explained with reference to the flow charts of FIG. 5 and 6.

Figure 5:
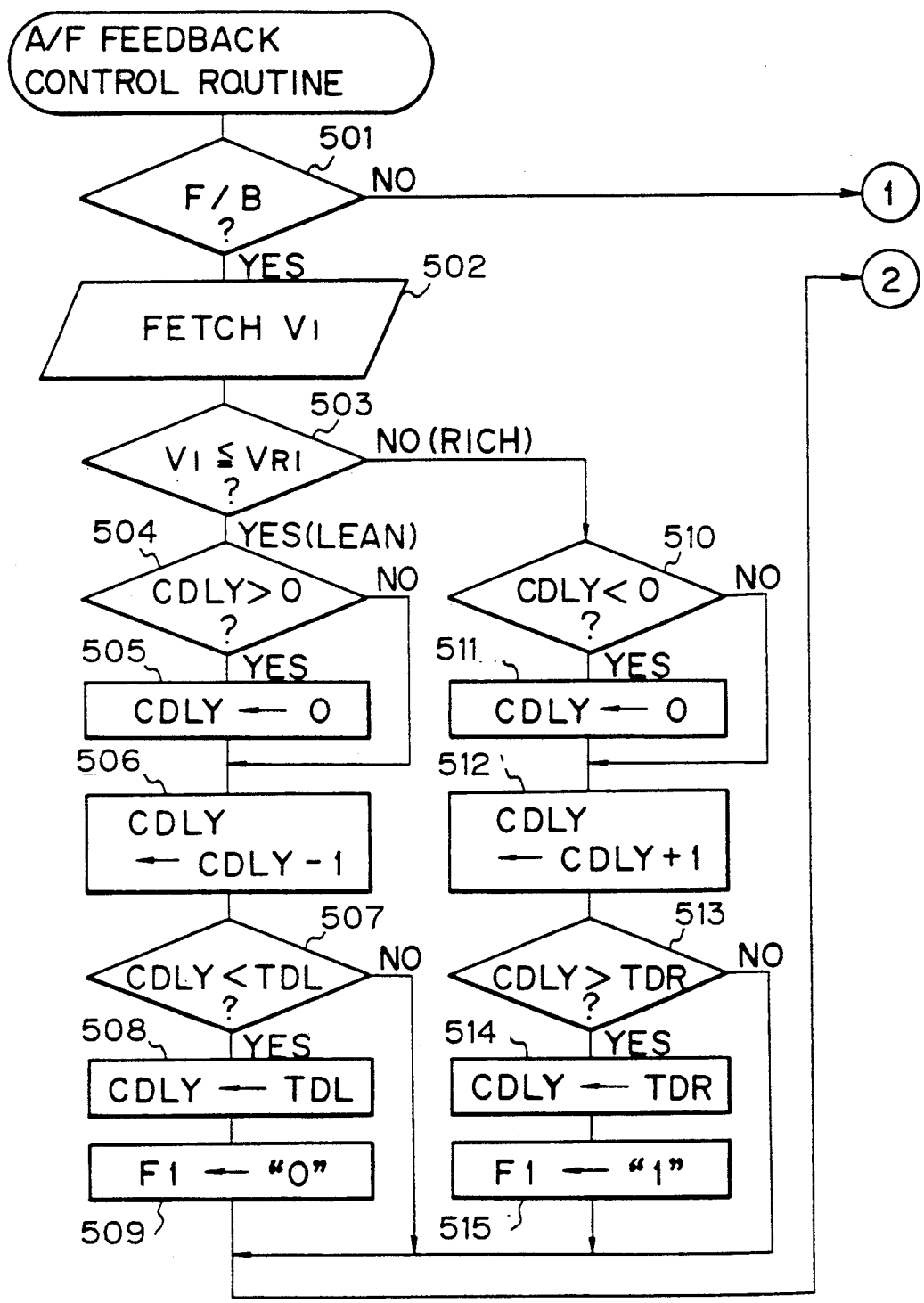
FIGS. 5 and 6 are flow charts showing the operation of the control circuit of FIG. 1.
Figure 6:
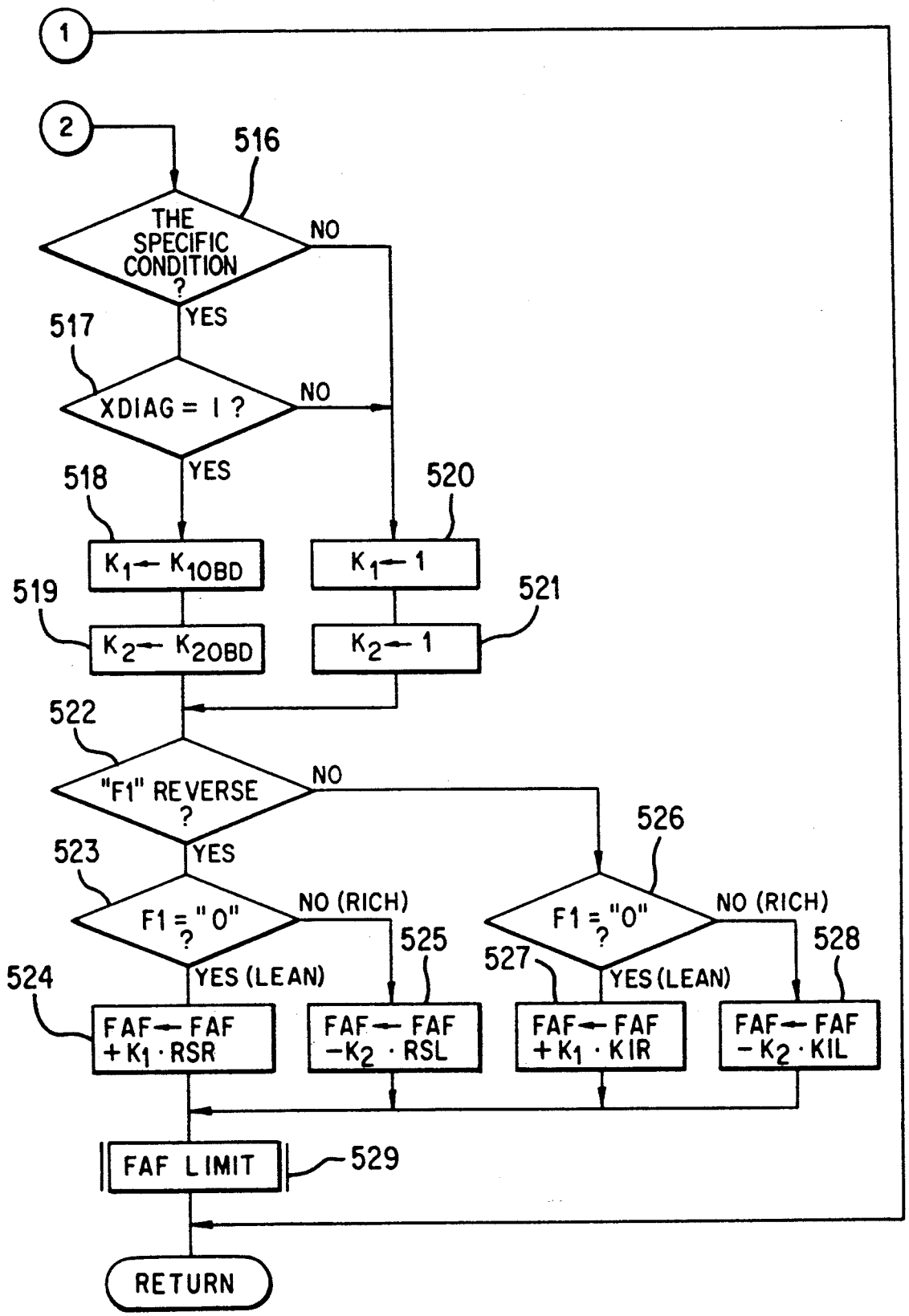

FIG. 5 and 6 illustrate a routine for calculating an air-fuel ratio feedback correction amount FAF in accordance with the output of the first $O_2$ sensor executed at a predetermined interval such as 4 ms.

At step 501, it is determined whether or not all of the feedback control (closed-loop control) conditions by the first $O_2$ sensor 13 are satisfied.

Feedback control is not allowed under the following conditions.

(1) The coolant temperature THW is lower than the predetermined temperature.
(2) The engine is in starting state.
(3) The fuel is increased after the start of the engine.
(4) The fuel is increased for engine warming.
(5) The fuel is increased for power up.
(6) The fuel is increased for protecting the over-heating of the catalyst.
(7) The output of the first $O_2$ sensor has never been inverted.
(8) The engine is in a fuel cut-off state.

If one or more feedback conditions are not satisfied, the control finishes. Note, an air-fuel ratio feedback correction amount FAF can be "1.0".

Contrary to the above, at step 501, if all of the feedback control conditions are satisfied, the control proceeds to step 502.

At step 502, an A/D conversion is performed upon the output voltage $V_1$ of the first $O_2$ sensor 13, and the A/D converted value thereof is then fetched from the A/D converter 101. Then at step 503, the voltage $V_1$ is compared with a reference voltage $V_{R1}$ such as 0.45 V, thereby determining whether the current air-fuel ratio is on the rich side or the lean side.

If the current air fuel ratio is lean, that is $V_1 \leq V_{R1}$, the control proceeds to step 504, which determines whether or not the value of a delay counter CDLY is positive. If CDLY>0, the control proceeds to step 505, which clears the delay counter CDLY, and then proceeds to step 506. If CDLY≦0, the control proceeds directly to step 506, the delay counter CDLY is counted down by "1", and at step 507, it is determined whether or not CDLY<TDL. Note that TDL is a lean delay time period for which a rich state is maintained even after the output of the first $O_2$ sensor 13 is changed from the rich side to the lean side, and is defined by a negative value.

At step 507, only when CDLY<TDL, the control proceeds to step 508, which causes CDLY to be TDL, and then to step 509, which causes a first air-fuel ratio flag F1 to be "0" (lean state).

On the other hand, if the current air fuel ratio is rich, that is $V_1 > V_{R1}$, the control proceeds to step 510, which determines whether or not the value of the delay counter CDLY is negative. If CDLY<0, the control proceeds to steps 511, which clears the delay counter CDLY, and then proceeds to step 512. If CDLY≧0, the control directly proceeds to step 512. At step 512, the delay counter CDLY is counted up by "1", and at step 513, it is determined whether or not CDLY>TDR. Note that TDR is a rich delay time period for which a lean state is maintained even after the output of the first $O_2$ sensor 13 is changed from the lean side to the rich side, and is defined by a positive value.

At step 513, only when CDLY>TDR does the control proceed to step 514, which causes CDLY to be TDR, and then to 515, which causes the first air-fuel ratio flag F1 to be "1" (rich state).

Next, at step 516, it is determined whether or not the engine is in a specific condition (OBD condition) where the diagnosis is permitted. For example, if the engine load (Q/Ne) or the engine speed (Ne) is stable, the engine is determined to be in the specific condition. At step 516, when the engine is in the OBD condition, the control proceeds to step 517, where it is determined whether the flag XDIAG is "1" or not.

The flag XDIAG is determined in the explained routine, and "1" of the flag XDIAG denotes that the diagnosis for determining the degree of deterioration has begun.

When the flag XDIAG=1 at step 517, the control proceeds to step 518 which causes $k_1$ to be $k_{1OBD}$, proceeds to step 519, which causes $k_2$ to be $k_{2OBD}$, and then proceeds to step 522.

That is, the coefficients $k_1$ and $k_2$ are forced to shift, and the air-fuel ratio correction amount is forced to reverse unsymmetrically around the value corresponding to the stoichiometric air-fuel ratio.

If the air-fuel ratio is shifted to the rich side, $k_{1OBD}$ may be 0.8–0.9 and $k_{2OBD}$ may be 1.1–1.2.

Note, $k_{1OBD}$ and $k_{2OBD}$ may be determined in accordance with the degree of deterioration of the catalyst.

Contrary to the above, if the air-fuel ratio is shifted to the lean side, $k_{1OBD}$ may be 1.1–1.2 and $k_{2OBD}$ may be 0.8–0.9.

On the other hand, when the engine is not in the OBD condition, the control proceeds to step 520, which causes $k_1$ to 1, proceeds to step 521, which causes $k_2$ to 1, and then proceeds to step 522.

Next, at step 522, it is determined whether or not the air-fuel flag F1 is reversed, that is, whether or not delayed air-fuel ratio is reversed. If the delayed air-fuel ratio is reversed, the control proceeds to step 523, which determines whether the reversion goes from the rich state to the lean state, or from the lean state to the rich state based on the air-fuel flag F1.

If the reversion goes from the rich state to the lean state, the control proceeds to step 524, which reads out the rich skip amount RSR from the back-up ROM 106, and remarkably increases the air-fuel ratio correction amount FAF by a skip amount $k_1 \cdot RSR$.

On the other hand, if the reversion goes from the lean state to the rich state, the control proceeds to step 525, which reads out the lean skip amount RSL from the back-up ROM 106, and remarkably decreases FAF by a skip amount $k_2 \cdot RSL$.

When it is determined that the air-fuel ratio flag F1 is not reversed, the integral operation is performed at step 526, 527 and 528. That is, at step 526, it is determined whether or not the flag F1 is "0". If the flag F1 is "0" (which means lean state), the control proceeds to step 527, which results in (FAF+$k_1 \cdot$KIR). And if the flag F1 is "1" (which means rich state), the control proceeds to step 528, which results in FAF−$k_2 \cdot$KIL). Note, the integral constant KIR and KIL are smaller than the skip amount RSR and RSL. The fuel injection amount is gradually increased at step 527, and gradually decreased at step 528.

Next, at step 529 the air fuel ratio correction amount FAF is limited between the minimum value, for example 0.8, and the maximum value, for example 1.2, in order to avoid control in the excess rich state or the excess lean state.

This routine is completed after the air-fuel ratio correction amount FAF is stored in the RAM 105.

Figure 7:
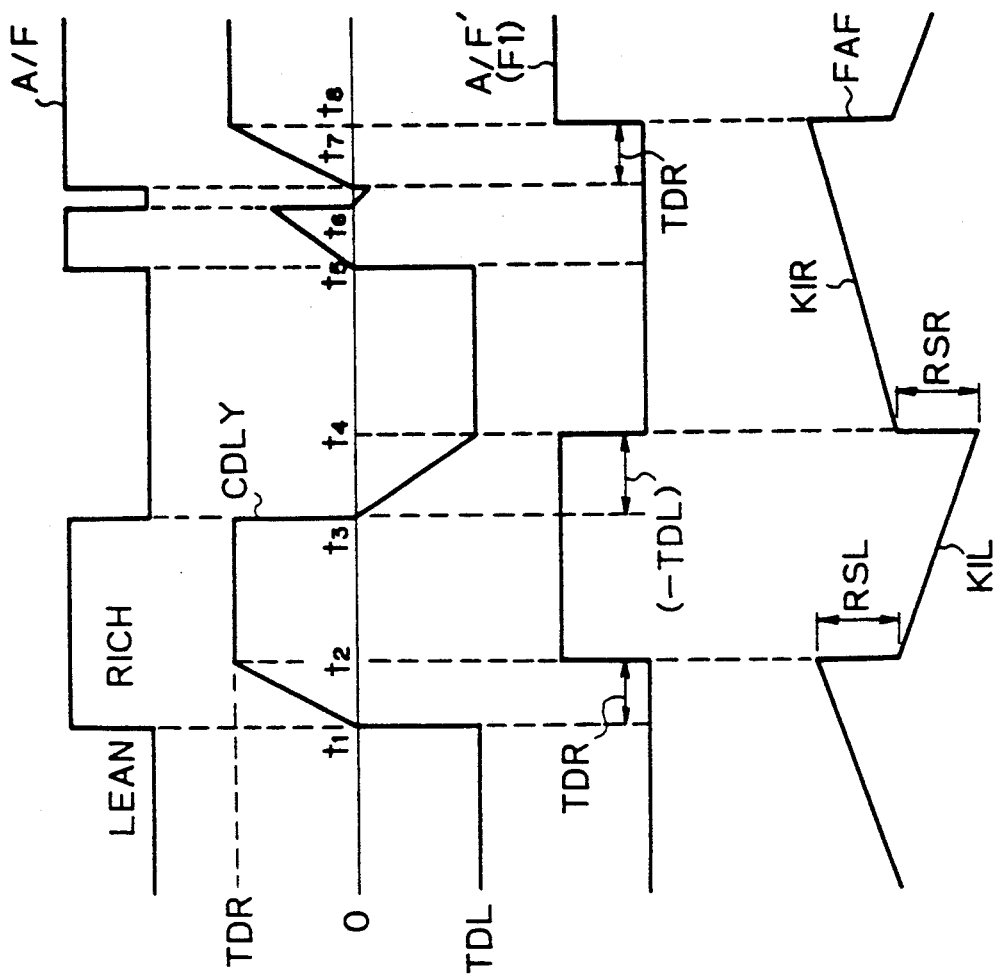
FIGS. 7A-7D are timing diagrams explaining the flow charts of FIGS. 5 and 6.

FIG. 7 is the timing diagram that explains the operation of the above explained routine. Note, $k_1 = k_2 = 1$.

The output voltage V of the first $O_2$ sensor shown at A) in FIG. 7 (A) is inverted from the rich state to the lean state or vice versa, the delay counter CDLY shown at B) in FIG. 7 is counted up during the rich state, and counted down during the lean state.

As a result, the delayed air-fuel ratio signal A/F' and the state thereof represented by the flag F1 is obtained.

For the example, when the air-fuel ratio signal A/F inverts from the lean state to the rich state at the time $t_1$, the delayed air-fuel ratio signal A/F' maintains the lean state for the rich delay time TDR and inverts to the rich state at $t_2$. On the other hand, when the air-fuel ratio signal A/F inverts from the rich state to the lean state at the time $t_3$, the delayed air-fuel ratio signal A/F' maintains the rich state for the lean delay time TDL and inverts to the lean state at $t_4$.

When the air-fuel ratio signal A/F, however, inverts from the lean state to the rich state at $t_5$, and again to the lean state at $t_6$ during an interval shorter than the delay time TDR or TDL, the delay counter CDLY is reset before reaching the maximum value TDR, and the delayed air-fuel ratio A/F, inverts to the rich state at $t_7$.

The delayed air-fuel ratio signal A/F', therefore, is more stable than the actual air-fuel ratio signal. The air-fuel ratio correction amount FAF is calculated based on this delayed air-fuel ratio signal A/F'.

In this embodiment, accurate control will be obtained after the air-fuel ratio is shifted, because two coefficients are forced to shift unsymmetrically.

Note, the four parameters, that is, the rich skip amount RSR, the lean skip amount RSL, the rich integral speed KIR and the lean integral speed KIL are modified for shifting the target air-fuel ratio in the above mentioned routine, but it is capable of shifting the target air-fuel ratio by modifying one of the four parameters.

Moreover, it is capable of shifting the target air-fuel ratio by modifying one of the delay times TDR, TDL and the reference voltage $V_{R1}$.

Figure 8:
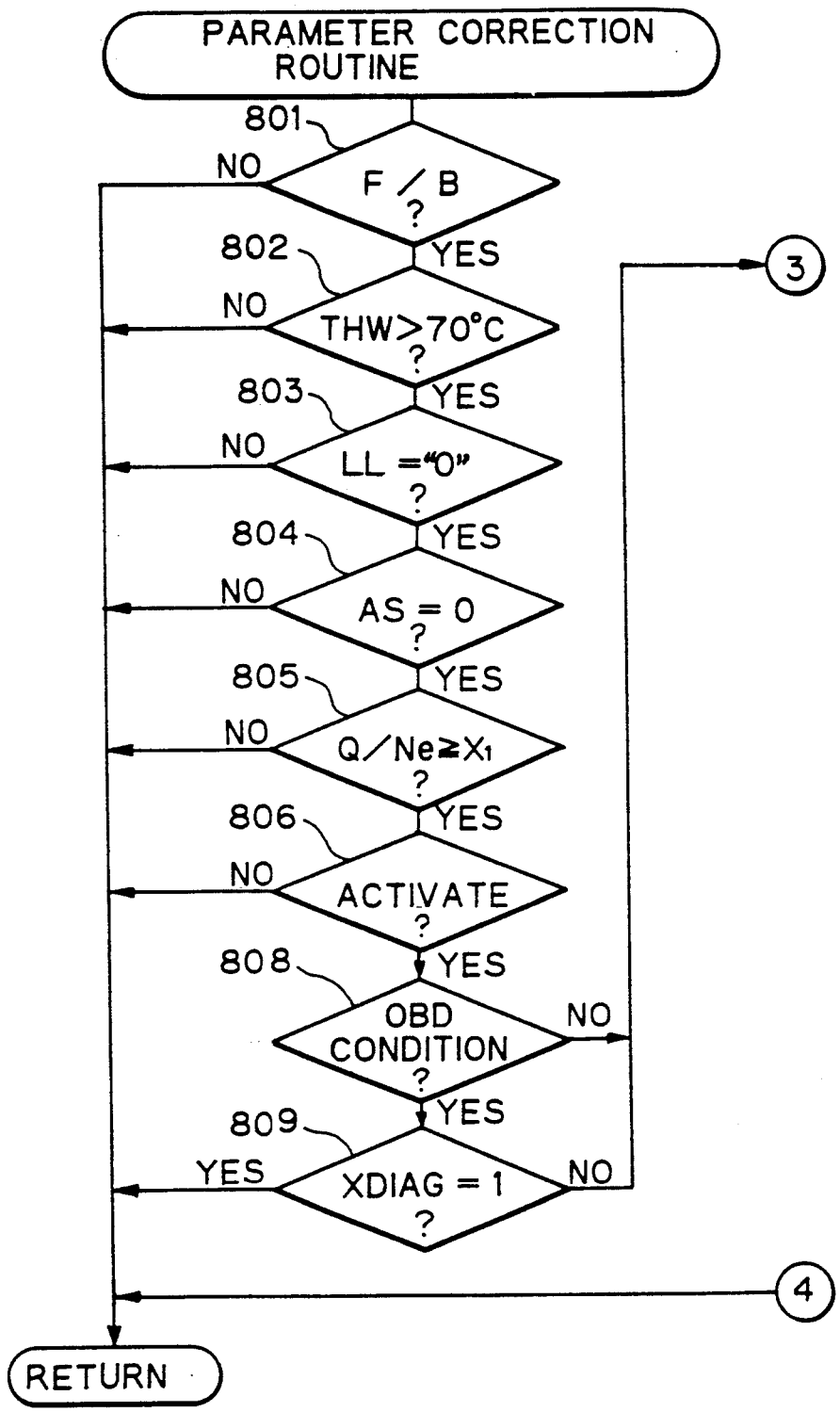
FIGS. 8, 9, 10, 11, 12 and 13 are flow charts showing the operation of the control circuit of FIG. 1.
Figure 9:
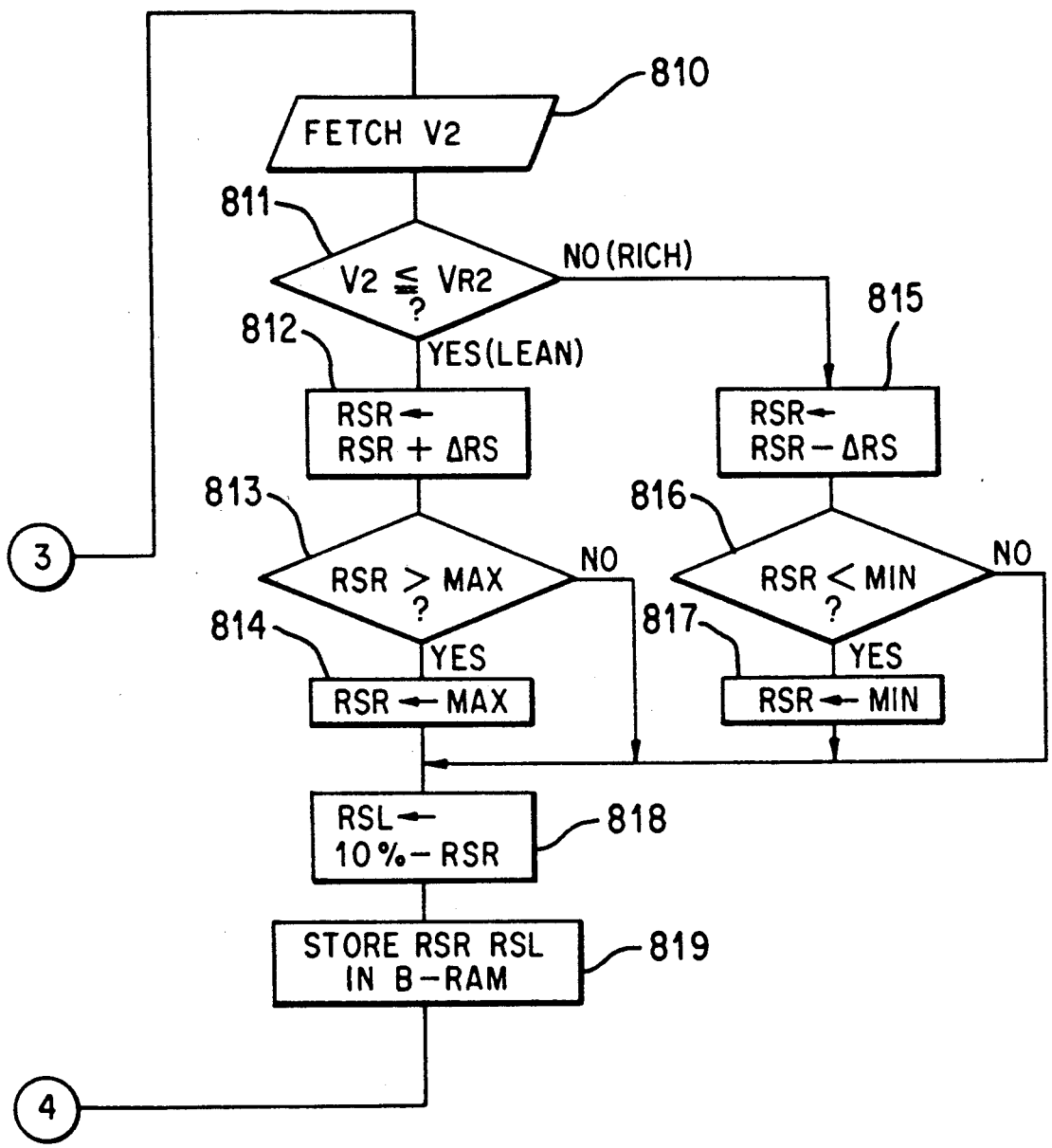

FIG. 8 and 9 illustrate a routine for correcting the parameter used in the air-fuel ratio feedback control routine in accordance with the output of the second $O_2$ sensor 15 executed at a predetermined interval, for example, 512 ms.

At step 801 through step 807, it is determined whether or not the closed-loop control using the second $O_2$ sensor is allowed. At step 801, it is determined whether or not the closed-loop control using the first $O_2$ sensor is allowed. And at step 802 through step 807, it is determined whether or not the additional conditions for performing the closed-loop control using the second $O_2$ sensor are satisfied.

That is, it is determined whether or not the coolant temperature THW is higher than the predetermined temperature, for example 70° C. (at step 802), the output of the idle switch LL is "0" (at step 803), the secondary air is supplied (at step 804), the engine is operating over the predetermined load (at step 805), the second $O_2$ sensor is in the activated state (at step 806). If the determination is "NO" at any one step, the control proceeds to return. If the determination is "YES" at all steps, the control proceeds to step 808.

At step 808, it is determined whether or not the OBD condition is satisfied. When the OBD condition is not satisfied, the control proceeds to step 810 for continuing the air-fuel ratio control based on two $O_2$ sensors. And when the OBD condition is satisfied, the control proceeds to step 809, where it is determined that the flag XDIAG is "1". When the flag XDIAG is "1", the control proceeds to the return step, not compensating the shifting of the target air-fuel ratio to diagnose the degree of deterioration of the catalyst.

At step 810, the output voltage $V_2$ of the second $O_2$ sensor 15 is fetched from the A/D converter, and at 811, it is determined whether or not $V_2$ is smaller than the reference voltage $V_{R2}$, for example 0.55 V. That is, it is determined whether the air-fuel ratio detected by the second $O_2$ sensor is in the rich state or in the lean state. In this embodiment, the reference voltage $V_{R2}$ is set as higher than $V_{R1}$ because the output characteristic of the second $O_2$ sensor is different from that of the first $O_2$ sensor and the speed of the deterioration of the second $O_2$ sensor is lower than that of the first $O_2$ sensor. But this is not a restriction, $V_{R2}$ may be lower than $V_{R1}$.

If $V_2 \leq V_{R2}$ (which means the lean state), the control proceeds to step 812, which increases the rich skip amount RSR by $\Delta R$. At step 813 and 814, RSR is limited by the maximum value MAX (for example 7.5%), and the control proceeds to step 818. If $V_2 > V_{R2}$ (which means the rich state), the control proceeds to step 815 which decreases RSR by $\Delta R$. At step 916 and 817, RSR is limited by the minimum value MIN (for example 2.5%), and the control proceeds to step 818. Note that, the minimum MIN is determined as a level not spoiling the quick response, and the maximum MAX is determined as a level not spoiling the drivability.

At step 818, the lean skip amount RSL is determined as follows:

$$RSL \leftarrow 10\% - RSR$$

At step 819, two skip amounts RSR and RSL are stored in the back-up memory RAM 106. And this routine is completed.

In this embodiment, the rich skip amount RSR is modified in accordance with the output of the second $O_2$ sensor 15, but other parameters, that is, the lean skip amount RSL, the rich integral speed KIR, the lean integral speed KIL, the rich delay time TDR, the lean delay time TDL and the reference voltage $V_{R2}$, may be modified in accordance with the output of the second $O_2$ sensor 15. And the different effect may be obtained by the parameter that is modified.

For example, the precise control for the air-fuel ratio can be realized by the modification of the delay time, and the fast response can be realized by the modification of the skip amount. More than two parameters may be simultaneously modified.

Figure 10:
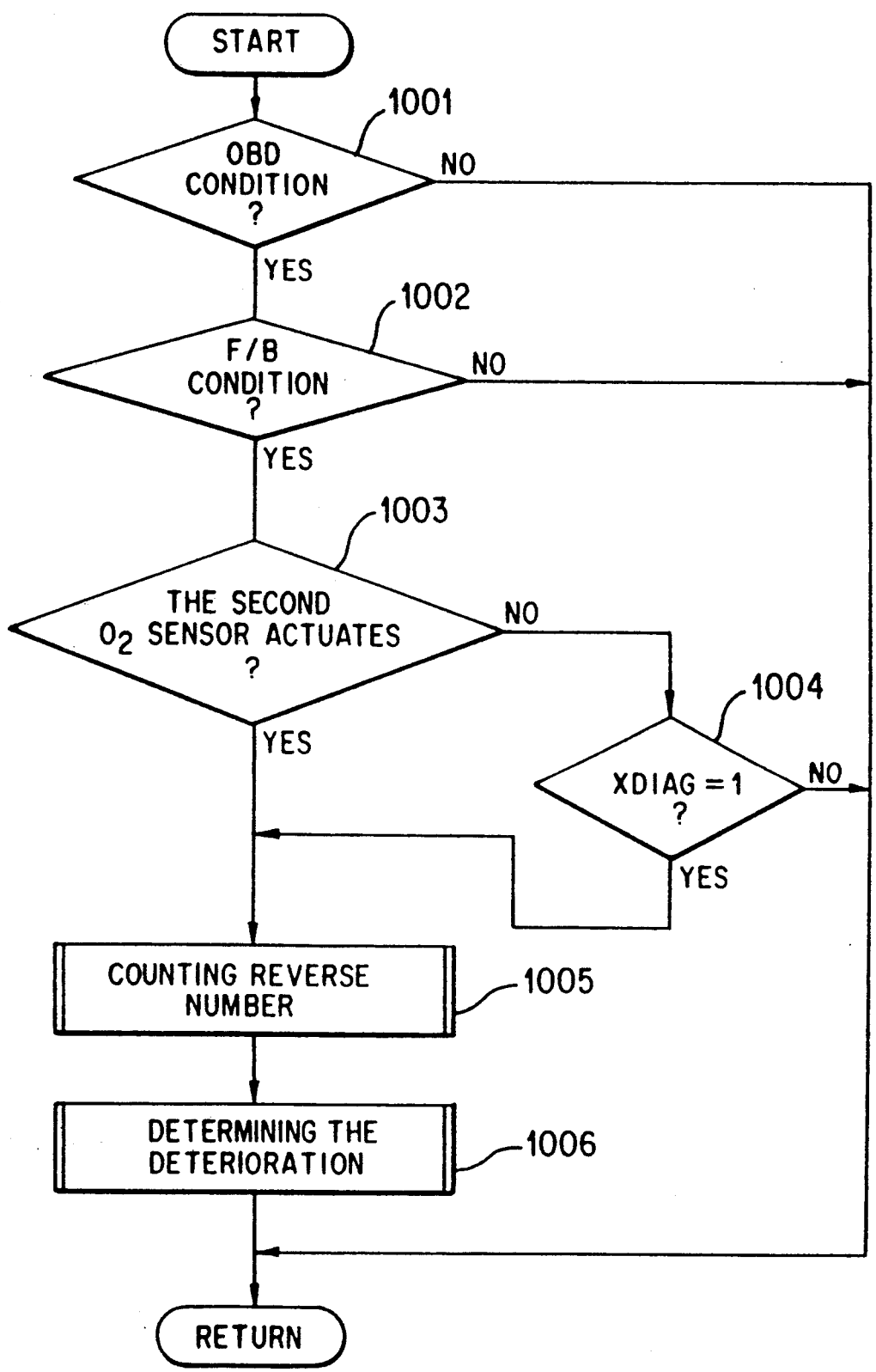

FIG. 10 is a routine for diagnosing the degree of deterioration of the catalyst in accordance with the reverse number of the first $O_2$ sensor 13 and the second $O_2$ sensor 15, executed at the predetermined interval, for example 4 ms.

At step 1001, it is determined whether or not the OBD condition is established. If this is not established, this routine is completed directly. On the other hand, if this is established, the control proceeds to step 1002, where it is determined whether or not the feedback control condition using the first $O_2$ sensor 13 is established. If this condition is not established, this routine is also completed directly. If this is established, the control proceeds to step 1003, where it is determined whether or not the second $O_2$ sensor 15 activates. If this activates, the control proceeds to step 1005 for diagnosing the degree of deterioration of the catalyst.

If the second $O_2$ sensor 15 does not activate, the control proceeds to step 1004, where it is determined whether or not the flag XDIAG is "1". If the flag XDIAG is "1", the control also proceeds to step 1005, and if not, this routine is completed.

At step 1005, the reverse number of the first $O_2$ sensor 13 and that of the second $O_2$ sensor 15 are counted, the control proceeds to step 1006, where the degree of deterioration is determined, and this routine is completed.

Figure 11:
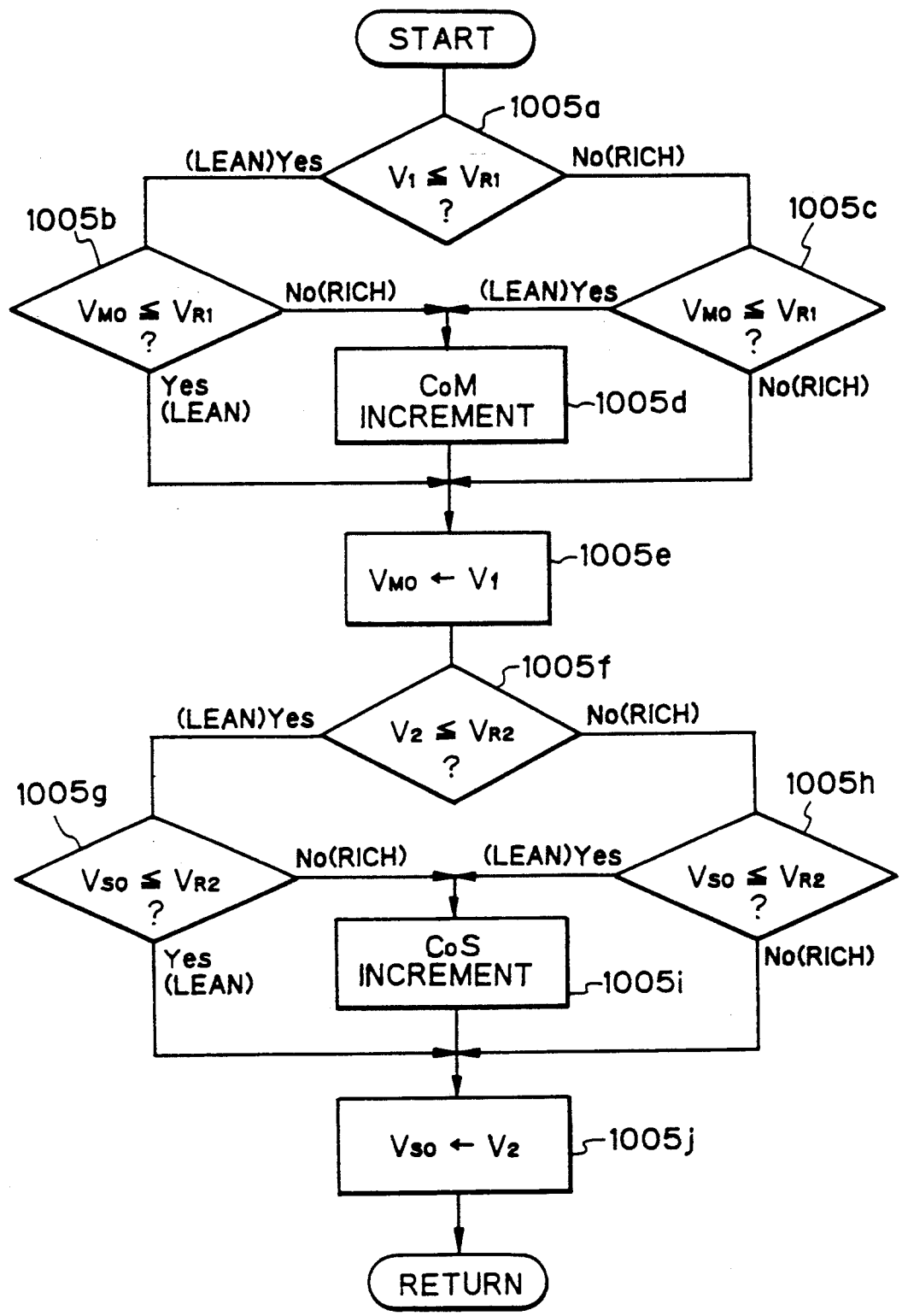

FIG. 11 is a flowchart of the process at step 1005.

At step 1005a, it is determined whether or not the present output voltage $V_1$ of the first $O_2$ sensor 13 is smaller than the reference voltage $V_{R1}$. If $V_1 \leq V_{R1}$, the control proceeds to step 1005b, where it is determined whether or not the previous output voltage $V_{MO}$ of the first $O_2$ sensor 13 is smaller than the reference voltage $V_{R1}$. If $V_{MO} \leq V_{R1}$, the control proceeds directly to step 1005e, and if not, the control proceeds to step 1005d.

If $V_1 > V_{R1}$ at step 1005a, the control proceeds to step 1005c, where it is determined whether or not the previous output voltage $V_{MO}$ of the first $O_2$ sensor 13 is smaller than the reference voltage $V_{R1}$. If $V_{MO} \leq V_{R1}$, the control proceeds to step 1005d, and if not, the control proceeds directly to step 1005e.

At step 1005d, the counter CoM, which represents the reverse number of the output voltage $V_1$ of the first $O_2$ sensor 13 is incremented, and the control proceeds to step 1005e, where the previous output voltage $V_{MO}$ is set to the present output voltage $V_1$.

At step 1005f, it is determined whether or not the present output voltage $V_2$ of the second $O_2$ sensor 15 is smaller than the reference voltage $V_{R2}$. If $V_2 \leq V_{R2}$, the control proceeds to step 1005g, where it is determined whether or not the previous output voltage $V_{SO}$ of the second $O_2$ sensor 15 is smaller than the reference voltage $V_{R2}$. If $V_{SO} \leq V_{R1}$, the control proceeds directly to step 1005j, and if not, the control proceeds to step 1005i.

If $V_2 > V_{R2}$ at step 1005f, the control proceeds to step 1005h, where it is determined whether or not the previous output voltage $V_{SO}$ of the second $O_2$ sensor 15 is smaller than the reference voltage $V_{R2}$. If $V_{SO} \leq V_{R2}$, the control proceeds to step 1005i, and if not, the control proceeds directly to step 1005j.

At step 1005i, the counter CoS which represents the reverse number of the output voltage $V_2$ of the second $O_2$ sensor 15 is incremented, and the control proceeds to step 1005j, where the previous output voltage $V_{SO}$ is set to the present output voltage $V_2$.

Figure 12:
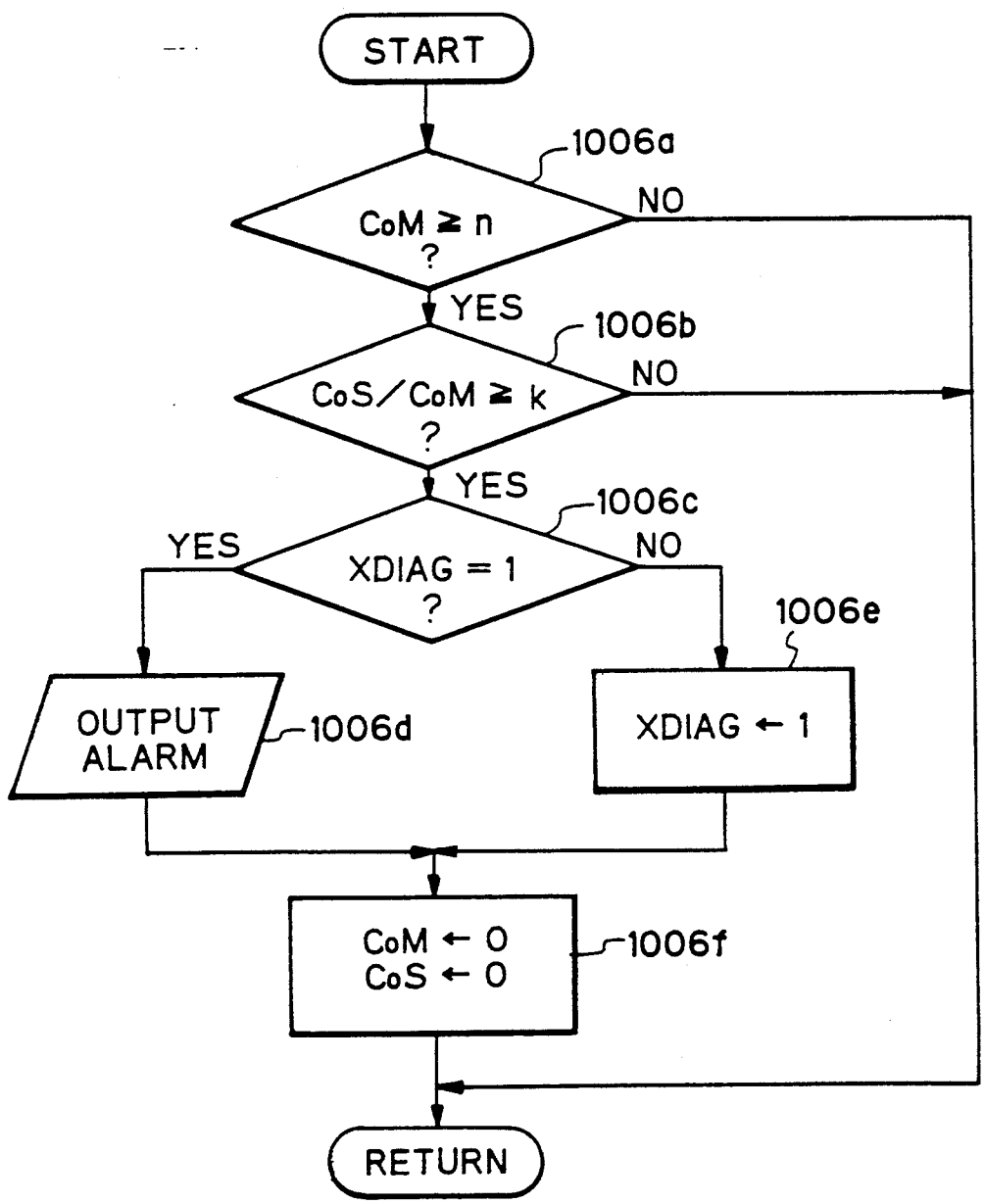

FIG. 12 is a flowchart of the process at step 1006.

At step 1006a, the reversing number CoM of the first $O_2$ sensor 13 is beyond the predetermined number n. If CM<n, this routine is directly completed. On the other hand, if CM≧n, the control proceeds to 1006b, where it is determined whether or not the ratio of the reversing number CoS of the second $O_2$ sensor 15 to CoM exceeds the predetermined k, for example 0.8.

If CS/CM≧k, the control proceeds to step 1006c, where it is determined whether or not the flag XDIAG is "1". If the flag XDIAG is "1", the control proceeds to step 1006d, where the alarm is output, because it is determined that the catalyst has already deteriorated to such a degree that it requires replacement.

Note, when it is determined that the catalyst has deteriorated to such a degree that it requires replacement, the state of the flag is stored in the back-up RAM 106.

If the flag XDIAG is not "1", the control proceeds to step 1006e, where the flag XDIAG sets to "1", because it is determined that the catalyst has deteriorated to the degree which require the diagnosis by shifting the target air-fuel ratio.

The flag XDIAG being "0" means that the reverse number of the second $O_2$ sensor 15 is approaching the reverse number of the first $O_2$ sensor 13, and it is determined that the degree of deterioration of the catalyst progresses to such a degree that it requires a diagnostic, and the center of the air-fuel ratio is forced to shift.

At step 1006, the counter CoM and Cos are cleared, and this process is completed.

Note, above-mentioned diagnostic is only required once a time per one trip. For example, this judgment may be inserted after step 1006d which sets a flag TRIP when the condition at step 1006b is negative and the flag XDIAG is "1", and is reset at the engine start. After the engine start, the above-mentioned diagnostic is carried out only when the flag TRIP is "1".

In this embodiment, the $V_{R2}$ is the value corresponding to the stoichiometric air-fuel ratio, but the $V_{R2}$ may be modified in accordance with two coefficient $k_1$ and $k_2$.

Note, if the shift is forced to the lean side, the $V_{R2}$ is decreased proportional to the shift amount of two coefficient $k_1$ and $k_2$.

In this embodiment, moreover, the ratio of the reverse number of the second $O_2$ sensor 15 to the reverse number of the first $O_2$ sensor 13 during an interval that the reverse number of the first $O_2$ sensor 13 reaches predetermined number is used for diagnostic, but same ratio during a predetermined interval may be used.

Diagnostic may be also carried based on a period of the reverse of the second $O_2$ sensor 15, or the length of the trajectory of the output of the second $O_2$ sensor 15.

Figure 13:
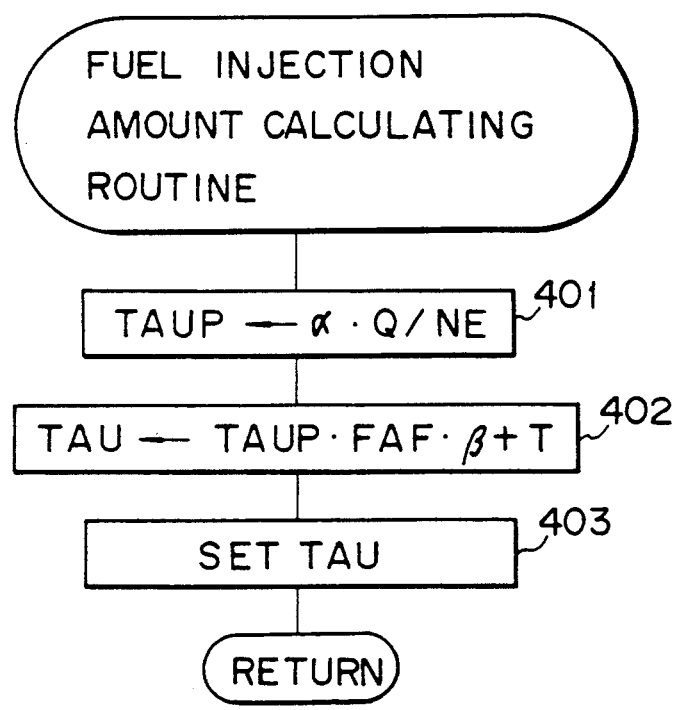

FIG. 13 is a routine for calculating a fuel injection amount TAU executed at a predetermined crank-angle, for example, 360° CA. At step 401, a base fuel injection amount TAUP is calculated in accordance with the intake air amount Q and the engine rotational speed Ne read out from the ROM 105. That is, $$TAUP \leftarrow \alpha \cdot Q/Ne$$

where $\alpha$ is a constant. At step 402, the final fuel injection amount is calculated by $$TAU \leftarrow TAUP \cdot FAF \cdot \beta + \gamma$$

where $\beta$ and $\gamma$ are correction factors determined by the engine operating condition. And at step 403, the final fuel injection amount TAU is set to the down counter 108, and in addition, the flip-flop 109 is set to initiate the activation of the fuel injection valve 7. Then this routine is completed.

Note that, the fuel injection is stopped, because the flip-flop 109 is reset by a carry-out signal output from the down-counter 108 after a time corresponding to the fuel injection amount TAU.

Note that, the karman vortex sensor or a heat wire type air flow sensor can be used instead of the air flow meter.

Although in the above-mentioned embodiments, a fuel injection amount is calculated on the basis of the intake air amount and the engine rotational speed, it can also be calculated on the basis of the intake air pressure and the engine rotational speed, or throttle opening and the engine rotational speed.

Further, the present invention can be applied to a carburetor type internal combustion engine in which the air-fuel ratio is controlled by the electric air control valve (EACV) for adjusting the intake air amount; by an electric bleed air control valve for adjusting the air bleed amount supplied to a main passage and a slow passage; or by adjusting the secondary air amount introduced into the exhaust system.

In this case, the base fuel injection amount corresponding to TAUP at step 401 of FIG. 13 is determined by the carburetor i.e., the intake air negative pressure and the engine rotational speed, and the air amount corresponding to TAU at step 403 of FIG. 13.

Further, a CO sensor, a lean-mixture sensor or the like can also be used instead of the $O_2$ sensor. Especially, if a $TiO_2$ sensor is used for the first $O_2$ sensor, it is possible to get good control response and to avoid excess compensation by the second $O_2$ sensor.

Also, the control circuit 10 in FIG. 1 is constructed by the microcomputer, that is, the control circuit 10 is constructed by the digital circuit in the above-described embodiments, but the analog circuit can be used to construct the control circuit 10.

I claim:

1. A method of detecting deterioration of a catalyst converter for removing pollutants in exhaust gas disposed within an exhaust gas passage of an internal combustion engine having upstream-side and downstream-side air-fuel ratio sensors disposed upstream and downstream, respectively, of said catalyst converter, comprising the steps of:

adjusting an air-fuel ratio correction factor in accordance with the output of said upstream-side air-fuel ratio sensor so that an air-fuel ratio is controlled at a predetermined target air-fuel ratio that is different from the stoichiometric air-fuel ratio, the air-fuel ratio changing from the rich state to the lean state, or vice versa; and determining whether or not said catalyst converter has deteriorated in accordance with the output of said downstream-side air-fuel ratio sensor when the air-fuel ratio is controlled in accordance with the adjusting step.

2. A method as set forth in claim 1, wherein said determining step comprises the steps of:

monitoring fluctuations in the output of said downstream-side air-fuel ratio sensor around a predetermined reference voltage; and monitoring whether the number of fluctuations is greater than a predetermined value.

3. A method as set forth in claim 1, wherein said determining step comprises the steps of:

monitoring fluctuations in the output of said upstream-side air-fuel ratio sensor around a reference voltage corresponding to the stoichiometric air-fuel ratio;

monitoring fluctuations in the output of said downstream-side air-fuel ratio sensor around a predetermined reference voltage; and calculating a difference between the number of upstream-side fluctuations and the number of downstream-side fluctuations when the number of upstream-side fluctuations is greater than a first predetermined value, and determining that said catalyst has deteriorated when the difference is greater than a second predetermined value.

4. A method as set forth in claim 1, wherein said determining step comprises the steps of:

monitoring fluctuations in the output of said upstream-side air-fuel ratio sensor around a reference voltage corresponding to the stoichiometric air-fuel ratio;

monitoring fluctuations in the output of said downstream-side air-fuel ratio sensor around a predetermined reference voltage; and determining that said catalyst has deteriorated when a ratio of the number of downstream-side fluctuations to the number of upstream-side fluctuations is greater than a predetermined value, which is about "1".

5. A method of detecting deterioration of a catalyst converter for removing pollutants in exhaust gas disposed within an exhaust gas passage of an internal combustion engine having upstream-side and downstream-side air-fuel ratio sensors disposed upstream and downstream, respectively, of said catalyst converter, comprising the steps of:

adjusting an air-fuel ratio correction factor in accordance with the output of said upstream-side air-fuel ratio sensor so that an air-fuel ratio is controlled at a predetermined target air-fuel ratio that is equal to the stoichiometric air-fuel ratio, the air-fuel ratio changing from the rich state to the lean state, or vice versa;

shifting the air-fuel ratio that is controlled in accordance with said adjusting step to an air-fuel ratio that is not equal to the stoichiometric air-fuel ratio; and determining whether or not said catalyst converter has deteriorated in accordance with the output of said downstream-side air-fuel ratio sensor when the air-fuel ratio is shifted to the air-fuel ratio that is not equal to the stoichiometric air-fuel ratio.

6. A method as set forth in claim 5, wherein said adjusting step comprises a step of:

increasing the air-fuel ratio correction factor when the air-fuel ratio changes from the lean state to the rich state, and decreasing the air-fuel ratio correction factor when the air-fuel ratio changes from the rich state to the lean state;

and said shifting step comprises a step of:

varying said correction factor.

7. A method as set forth in claim 5, wherein said adjusting step comprises a step of:

gradually increasing the air-fuel ratio correction factor while the air-fuel ratio remains in the rich state, and gradually decreasing the air-fuel ratio correction factor while the air-fuel ratio remains in the lean state;

and said shifting step comprises a step of:

varying said correction factor.

8. A method as set forth in claim 5, wherein said adjusting step comprises a step of:

delaying a time at which the air-fuel ratio changes from the rich state to the lean state by a predetermined lean delay time, and a time at which the air-fuel ratio changes from the lean state to the rich state by a predetermined rich delay time;

and said shifting step comprises a step of:

varying said lean delay time, and said rich delay time.

9. A method of detecting a deterioration of a catalyst converter for removing pollutants in exhaust gas disposed within an exhaust gas passage of an internal combustion engine having upstream-side and downstream-side air-fuel ratio sensor disposed upstream and downstream, respectively, of said catalyst converter, comprising the steps of:

adjusting an air-fuel ratio correction factor in accordance with the output of said upstream-side air-fuel ratio sensor so that an air-fuel ratio is controlled at a predetermined target air-fuel ratio that is equal to the stoichiometric air-fuel ratio, the air-fuel ratio changing from the rich state to the lean state, or vice verse;

monitoring fluctuations in the output of said downstream-side air-fuel ratio sensor around a predetermined reference voltage, and determining that the degree of deterioration of said catalyst is such that a diagnostic procedure is required when the number of fluctuations during a predetermined interval is greater than a predetermined value;

shifting the air-fuel ratio that is controlled in accordance with said adjusting step to an air-fuel ration that is not equal to the stoichiometric air-fuel ratio, when the degree of deterioration of said catalyst is such that it requires a diagnostic procedure; and determining whether or not said catalyst converter has deteriorated in accordance with the output of said downstream-side air-fuel ratio sensor when the air-fuel ratio is shifted to the air-fuel ratio that is not equal to the stoichiometric air-fuel ratio in accordance with said shifting step.

10. A method as set forth in claim 9, wherein said adjusting step comprises a step of:
increasing the air-fuel ratio correction factor when the air-fuel ratio changes from the lean state to the rich state, and decreasing the air-fuel ratio correction factor when the air-fuel ratio changes from the rich state to the lean state;
and said shifting step comprises a step of:
varying said correction factor.

11. A method as set forth in claim 9, wherein said adjusting step comprises a step of:
gradually increasing the air-fuel ratio correction factor while the air-fuel ratio remains in the rich state, and gradually decreasing the air-fuel ratio correction factor while the air-fuel ratio remains in the lean state;
and said shifting step comprises a step of:
varying said correction factor.

12. A method as set forth in claim 9, wherein said adjusting step comprises a step of:
delaying a time at which the air-fuel ratio changes from the rich state to the lean state by a predetermined lean delay time, and a time at which the air-fuel ratio changes from the lean state to the rich state by a predetermined rich delay time;
and said shifting step comprises a step of:
varying said lean delay time and said rich delay time.

13. A method as set forth in claim 9, wherein said determining step comprises the steps of:
monitoring fluctuations in the output of said downstream-side air-fuel ratio sensor around a predetermined reference voltage; and
monitoring whether the number of fluctuations is greater than the predetermined value.

14. A method as set forth in claim 9, wherein said determining step comprises the steps of:
monitoring fluctuations in the output of said upstream-side air-fuel ratio sensor around a reference voltage corresponding to the stoichiometric air-fuel ratio;
monitoring fluctuations in the output of said downstream-side air-fuel ratio sensor around a predetermined reference voltage; and
calculating a difference between the number of upstream-side fluctuations and the number of downstream-side fluctuations when the number of upstream-side fluctuations is greater than the predetermined value, and determining that said catalyst has deteriorated when the difference is greater than a second predetermined value.

15. A method as set forth in claim 9, wherein said determining step comprises the steps of:
monitoring fluctuations in the output of said upstream-side air-fuel ratio sensor around a reference voltage corresponding to the stoichiometric air-fuel ratio;
monitoring fluctuations in the output of said downstream-side air-fuel ratio sensor around a predetermined reference voltage; and
determining that said catalyst has deteriorated when a ratio of the number of downstream-side fluctuations to the number of upstream-side fluctuations is greater than the predetermined value, which is about "1".

16. An apparatus for controlling an air-fuel ratio and detecting deterioration of a catalyst converter for removing pollutants in exhaust gas disposed within an exhaust gas passage of an internal combustion engine having upstream-side and downstream-side air-fuel ratio sensors disposed upstream and downstream, respectively, of said catalyst converter, comprising:
means for adjusting an air-fuel ratio correction factor in accordance with the output of said upstream-side air-fuel ratio sensor so that the air-fuel ratio is controlled at a predetermined target air-fuel ratio that is different from the stoichiometric air-fuel ratio, the air-fuel ratio changing from the rich state to the lean state, or vice versa; and
means for determining whether or not said catalyst converter has deteriorated in accordance with the output of said downstream-side air-fuel ratio sensor when the air-fuel ratio is controlled in accordance with said adjusting means.

17. An apparatus as set forth in claim 16, wherein said determining means comprises:
means for monitoring fluctuations in the output of said downstream-side air-fuel ratio sensor around a predetermined reference voltage; and
means for monitoring whether the number of fluctuations is greater than a predetermined value.

18. An apparats as set forth in claim 16, wherein said determining means comprises:
means for monitoring fluctuations in the output of said upstream-side air-fuel ratio sensor around a reference voltage corresponding to the stoichiometric air-fuel ratio;
means for monitoring fluctuations in the output of said downstream-side air-fuel ratio sensor around a predetermined reference voltage; and
means for calculating a difference between the number of upstream-side fluctuations and the number of downstream-side fluctuations when the number of upstream-side fluctuations is greater than a first predetermined value, and determining that said catalyst has deteriorated when the difference is greater than a second predetermined value.

19. An apparatus as set forth in claim 16, wherein said determining means comprises:
means for monitoring fluctuations in the output of said upstream-side air-fuel ratio sensor around a reference voltage corresponding to the stoichiometric air-fuel ratio;
means for monitoring fluctuations in the output of said downstream-side air-fuel ratio sensor around a predetermined reference voltage; and
means for determining that said catalyst has deteriorated when a ratio of the number of downstream-side fluctuations to the number of upstream-side fluctuations is greater than a predetermined value, which is about "1".

20. An apparatus for controlling an air-fuel ratio and detecting deterioration of a catalyst converter for removing pollutants in exhaust gas disposed within an exhaust gas passage of an internal combustion engine having upstream-side and downstream-side air-fuel ratio sensors disposed upstream and downstream, respectively, of said catalyst converter, comprising:
means for adjusting an air-fuel ratio correction factor in accordance with the output of said upstream-side air-fuel ratio sensor so that the air-fuel ratio is controlled at a predetermined target air-fuel ratio that is equal to the stoichiometric air-fuel ratio, the air-fuel ratio changing from the rich state to the lean state, or vice verse;

means for shifting the air-fuel ratio that is controlled in accordance with said adjusting means to an air-fuel ratio that is not equal to the stoichiometric air-fuel ratio; and means for determining whether or not said catalyst converter has deteriorated in accordance with the output of said downstream-side air-fuel ratio sensor when the air-fuel ratio is shifted to the air-fuel ratio that is not equal to the stoichiometric air-fuel ratio.

21. An apparatus as set forth in claim 20, wherein said adjusting means comprises:

means for increasing the air-fuel ratio correction factor when the air-fuel ratio changes from the lean state to the rich state, and decreasing the air-fuel ratio correction factor when the air-fuel ratio changes from the rich state to the lean state;

and said shifting means comprises:

means for varying said correction factor.

22. An apparatus as set forth in claim 20, wherein said adjusting means comprises:

means for gradually increasing the air-fuel ratio correction factor while the air-fuel ratio remains in the rich state, and gradually decreasing the air-fuel ratio correction factor while the air-fuel ratio remains in the lean state;

and said shifting means comprises:

means for varying said correction factor.

23. An apparatus as set forth in claim 22, wherein said adjusting means comprises:

means for delaying a time at which the air-fuel ratio changes from the rich state to the lean state by a predetermined lean delay time, and a time at which the air-fuel ratio changes from the lean state to the rich state by a predetermined rich delay time;

and said shifting means comprises:

means for varying said lean delay time and said rich delay time.

24. An apparatus as set forth in claim 20, wherein said determining means comprises:

means for monitoring fluctuations in the output of said downstream-side air-fuel ratio sensor around a predetermined reference voltage; and means for monitoring whether the number of fluctuations is greater than a predetermined value.

25. An apparats as set forth in claim 20, wherein said determining means comprises:

means for monitoring fluctuations in the output of said upstream-side air-fuel ratio sensor around a reference voltage corresponding to the stoichiometric air-fuel ratio;

means for monitoring fluctuations in the output of said downstream-side air-fuel ratio sensor around a predetermined reference voltage; and means for calculating a difference between the number of upstream-side fluctuations and the number of downstream-side fluctuations when the number of upstream-side fluctuations is greater than a first predetermined value, and determining that said catalyst has deteriorated when the difference is greater than a second predetermined value.

26. An apparatus as set forth in claim 20, wherein said determining means comprises:

means for monitoring fluctuations in the output of said upstream-side air-fuel ratio sensor around a reference voltage corresponding to the stoichiometric air-fuel ratio;

means for monitoring fluctuations in the output of said downstream-side air-fuel ratio sensor around a predetermined reference voltage; and means for determining that said catalyst has deteriorated when a ratio of the number of downstream-side fluctuations to the number of upstream-side fluctuations is greater than a predetermined value, which is about "1".

27. An apparatus for controlling an air-fuel ratio and detecting deterioration of a catalyst converter for removing pollutants in exhaust gas disposed within an exhaust gas passage of an internal combustion engine having upstream-side and downstream-side air-fuel ratio sensors disposed upstream and downstream, respectively, of said catalyst converter, comprising:

means for adjusting an air-fuel ratio correction factor in accordance with the output of said upstream-side air-fuel ratio sensor so that the air-fuel ratio is controlled at a predetermined target air-fuel ratio that is equal to the stoichiometric air-fuel ratio, the air-fuel ratio changing from the rich state to the lean sate, or vice versa;

means for monitoring fluctuations in the output of said downstream-side air-fuel ratio sensor around a predetermined reference voltage, and determining that the degree of deterioration of said catalyst is such that a diagnostic procedure is required when the number of fluctuations during a predetermined interval is greater than a predetermined value;

means for shifting the air-fuel ratio that is controlled in accordance with said adjusting means to an air-fuel ratio that is not equal to the stoichiometric air-fuel ratio, when the degree of deterioration of said catalyst is such that a diagnostic procedure is required; and means for determining whether or not said catalyst converter has deteriorated in accordance with the output of said downstream-side air-fuel ratio sensor when the air-fuel ratio is shifted to the air-fuel ratio that is not equal to the stoichiometric air-fuel ratio in accordance with said shifting means.

28. An apparatus as set forth in claim 27, wherein said adjusting means comprises;

means for increasing the air-fuel ratio correction factor when the air-fuel ratio changes from the lean state to the rich state, and decreasing the air-fuel ratio correction factor when the air-fuel ratio changes from the rich state to the lean state;

and said shifting means comprises:

means for varying said correction factor.

29. An apparatus as set forth in claim 27, wherein said adjusting means comprises:

means for gradually increasing the air-fuel ratio correction factor while the air-fuel ratio remains in the rich state, and gradually decreasing the air-fuel ratio correction factor while the air-fuel ratio remains in the lean state;

and said shifting means comprises:

means for varying said correction factor.

30. An apparatus as set forth in claim 27, wherein said adjusting means comprises:

means for delaying a time at which the air-fuel ratio changes from the rich state to the lean state by a predetermined lean delay time, and a time at which the air-fuel ratio changes from the lean state to the rich state by a predetermined rich delay time;

and said shifting means comprises:

means for varying said lean delay time and said rich delay time.

31. An apparatus as set forth in claim 27, wherein said determining means comprises:
- means for monitoring fluctuations in the output of said downstream-side air-fuel ratio sensor around a predetermined reference voltage; and
- means for monitoring whether the number of fluctuations is greater than the predetermined value.

32. An apparatus as set forth in claim 27, wherein said determining means comprises:
- means for monitoring fluctuations in the output of said upstream-side air-fuel ratio sensor around a reference voltage corresponding to the stoichiometric air-fuel ratio;
- means for monitoring fluctuations in the output of said downstream-side air-fuel ratio sensor around a predetermined reference voltage; and
- means for calculating a difference between the number of upstream-side fluctuations and the number of downstream-side fluctuations when the number of upstream-side fluctuations is greater than the predetermined value, and determining that said catalyst has deteriorated when the difference is greater than a second predetermined value.

33. An apparatus as set forth in claim 27, wherein said determining means comprises:
- means for monitoring fluctuations in the output of said upstream-side air-fuel ratio sensor around a reference voltage corresponding to the stoichiometric air-fuel ratio;
- means for monitoring fluctuations in the output of said downstream-side air-fuel ratio sensor around a predetermined reference voltage; and
- means for determining that said catalyst has deteriorated when a ratio of the number of downstream-side fluctuations to the number of upstream-side fluctuations is greater than the predetermined value, which is about "1".

* * * * *